United States Patent
McGowan (10) Patent No.: US 7,376,435 B2
(45) Date of Patent: May 20, 2008

(54) TRANSFERRING MULTIPLE DATA UNITS OVER A WIRELESS COMMUNICATION LINK

(75) Inventor: Steven B. McGowan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 935 days.

(21) Appl. No.: 10/113,039

(22) Filed: Apr. 1, 2002

(65) Prior Publication Data

US 2003/0186715 A1 Oct. 2, 2003

(51) Int. Cl.
*H04B 7/00* (2006.01)

(52) U.S. Cl. .................. 455/509; 455/67.13; 709/203; 709/228

(58) Field of Classification Search ........... 455/509, 455/517, 452, 41, 456, 450, 403, 404.1, 522, 455/557, 423, 502, 524, 452.2, 515, 67.13, 455/69; 370/428, 348, 503, 466, 473, 465; 709/227–228, 203, 200, 223, 310
See application file for complete search history.

(56) References Cited

U.S. PATENT DOCUMENTS

| | | | | |
|---|---|---|---|---|
| 4,672,543 A | * | 6/1987 | Matsui et al. ............... | 709/235 |
| 5,680,151 A | * | 10/1997 | Grimm et al. .............. | 345/419 |
| 5,729,733 A | * | 3/1998 | Sharif-Askary ................ | 707/8 |
| 5,922,040 A | * | 7/1999 | Prabhakaran ............... | 701/117 |
| 5,949,411 A | * | 9/1999 | Doerr et al. ................ | 715/716 |
| 5,968,114 A | * | 10/1999 | Wentka et al. ............. | 718/100 |
| 6,011,802 A | * | 1/2000 | Norman ....................... | 370/466 |
| 6,137,792 A | * | 10/2000 | Jonas et al. .................. | 370/354 |
| 6,259,928 B1 | * | 7/2001 | Vembu ........................ | 455/522 |
| 6,345,296 B1 | * | 2/2002 | McCrory et al. ........... | 709/228 |
| 6,363,458 B1 | * | 3/2002 | Park ........................... | 711/141 |
| 6,374,079 B1 | * | 4/2002 | Hsu ........................... | 455/11.1 |
| 6,449,631 B1 | * | 9/2002 | Takamoto et al. ........... | 709/200 |
| 6,456,858 B1 | * | 9/2002 | Streter ...................... | 455/552.1 |
| 6,519,460 B1 | * | 2/2003 | Haartsen ................... | 455/452.1 |

(Continued)

OTHER PUBLICATIONS

Bluetooth, *Logical Link Control and Adaptation Protocol Specification*, Bluetooth Specification Version 1.1, pp. 253-330 (May 8, 2001).

*Primary Examiner*—Tan Trinh
(74) *Attorney, Agent, or Firm*—Trop, Pruner & Hu, P.C.

(57) ABSTRACT

A wireless communication system may include a first transceiver that may concurrently keep at least two data units, such as payloads of data pending for transfer to a second transceiver (e.g., a targeted wireless communication device) over a communication link (e.g., a short-range radio link) on a communication channel. To wirelessly communicate with one or more networked wireless communication devices or systems, in one embodiment, the first transceiver is located in a device that may use a local link control and adaptation protocol capable of non-blocking data transfer operations. In one embodiment, pending multiple, data units are buffered to participate in a data streaming session. The transfer of the data units may be monitored to determine whether or not a data transfer operation was successful during the data streaming session. When the protocol learns that during the data streaming session a problem occurred with a data unit that was pending, the problem may be reported via an event instead of waiting for feedback to arrive from the targeted wireless communication device.

29 Claims, 8 Drawing Sheets

U.S. PATENT DOCUMENTS

| | | | |
|---|---|---|---|
| 6,570,885 B1* | 5/2003 | Gregg | 370/428 |
| 6,771,659 B1* | 8/2004 | Parantainen et al. | 370/466 |
| 2001/0027486 A1* | 10/2001 | Takamoto et al. | 709/227 |
| 2002/0002062 A1* | 1/2002 | Itazu et al. | 455/557 |
| 2002/0018458 A1* | 2/2002 | Aiello et al. | 370/348 |
| 2002/0197998 A1* | 12/2002 | Schmidt | 455/452 |
| 2003/0112820 A1* | 6/2003 | Beach | 370/465 |
| 2003/0131140 A1* | 7/2003 | Ghose et al. | 709/310 |
| 2003/0134645 A1* | 7/2003 | Stern et al. | 455/456 |
| 2003/0153335 A1* | 8/2003 | Johnson et al. | 455/502 |
| 2004/0033795 A1* | 2/2004 | Walsh et al. | 455/404.1 |
| 2005/0094667 A1* | 5/2005 | Dahlman et al. | 370/473 |

* cited by examiner

TRANSFERRING MULTIPLE DATA UNITS OVER A WIRELESS COMMUNICATION LINK

BACKGROUND

This invention relates to wireless communication systems, and more particularly, to data transfer over a wireless communication link.

A wireless transfer of voice, video, and/or data over a short-range communication link may be difficult because short-range wireless communications not only have to be low-power but also have to be able to overcome interference and fading while providing wireless communications comparable to wireline data transmission rates. To obviate some of these constraints while providing a robust short-range communication link between a source and a target transceiver, a constant feedback is generally needed from the receiving end to the transmitting end. More specifically, this feedback may be transmitted as an acknowledgement and voice, video and/or data may be transferred on a data unit-to-data unit basis after receiving feedback for each transmitted data unit. Under these circumstances, a constant supply of data units to be transferred may need to be made available at the source transceiver to continuously transfer voice, video, and/or data to the target transceiver.

Typically, such voice, video, and/or data may be communicated in a plurality of payloads. Each payload may be broken further into one or more packets that are exchanged between at least two wirelessly networked devices or systems. With conventional short-range wireless communication systems, however, keeping more than one payload pending for a wireless transfer at a given time may be difficult. In one of such conventional wireless communication systems, a successful data transfer operation involves transmitting a data packet over an air interface and acknowledging receipt of that data packet (including any retries). After the transmission of the data packet, however, a transmitter must wait for a response indicative of a successful transmission or a timeout from a receiver before preparing a next payload for a transmission. As a result, the latency constraints on data transmission are increased due to the need to wait for the communication of the data packet to complete before preparing the next payload for transmission.

Thus, there is a continuing need for better ways to wirelessly communicate over a communication link.

DETAILED DESCRIPTION

Figure 1A:
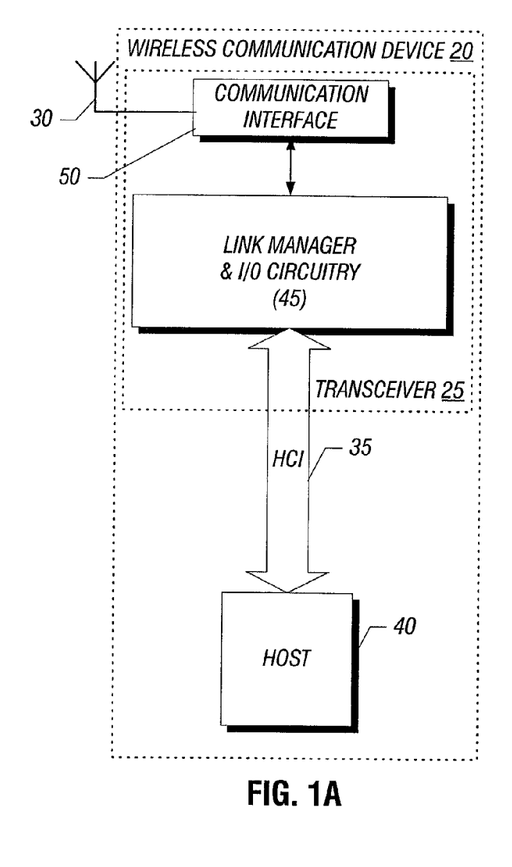
FIG. 1A is a schematic depiction of a wireless communication device in accordance with one embodiment of the present invention.

A wireless communication device 20 as shown in FIG. 1A may comprise a transceiver 25 including an antenna 30 to wirelessly communicate to another targeted transceiver (not shown) over a short-range communication link. Examples of the wireless communication device 20 include a processor-based system such as a desktop computer, a laptop computer, a server, or any one of a variety of other computers, peripherals, processor-based devices, cellular phones, or access points to a network (e.g., a public switched telephone network (PSTN)).

While physically separated from the wireless communication device 20, the targeted transceiver may be capable of transmitting to and receiving from the transceiver 25 wireless communications including multiple data units embedded in one or more payloads across a communication channel. Examples of the data units include packets of data, which may carry information, other media (e.g., voice, video), security data, or data integrity bits. Similarly, examples of the targeted transceiver include a processor-based device, or any one of a variety of other peripheral devices capable of wireless communications using voice, video and/or data circuitry over a short-range wireless communication link. These wireless communications may provide a wireless interconnect between small mobile devices and their peripherals, as an example by replacing cables used on mobile devices with radio frequency waves.

The wireless communication device 20 may further comprise a host controller interface (HCI) 35 to operably couple the transceiver 25 to a host 40. In operation, the HCI 35 may provide a serial or parallel communication link, such as a bus between the transceiver 25 and the host 40, as an example.

In one embodiment, the transceiver 25 may include a link manager and input/output (I/O) circuitry module 45 for operating a communication interface 50 coupled to the antenna 30. While the link manager of the module 45 may be executed by a microcontroller (not shown), the I/O circuitry in the module 45 may be responsible for driving the communication interface 50 in real-time in some cases. For example, the I/O circuitry in the module 45 may include conventional baseband hardware for digital processing of communication signals to and from the antenna 30, and a radio frequency front-end to perform analog processing of the communication signals.

Communication signals may comprise voice, video, and/or data in some embodiments of the present invention. In operation, data may be communicated in multiple payloads. Each payload may be broken into one or more packets. By keeping multiple payloads pending and/or decoupling the completion of transmission of individual payloads from associated packets, data communication overhead may be significantly reduced. In one embodiment, as an example, even if blocking of packets may cause blocking of payloads, buffering additional payloads for subsequent transmission in response to a notification for a completion of transmission may provide substantial savings in data communication overhead. Likewise, another embodiment of the wireless communication device 20 may continue to send new payloads that are buffered relative to earlier sent payloads while one or more packets associated with the previously sent payloads may have been blocked, resulting in significant amount of savings in data communication overhead.

Figure 1B:
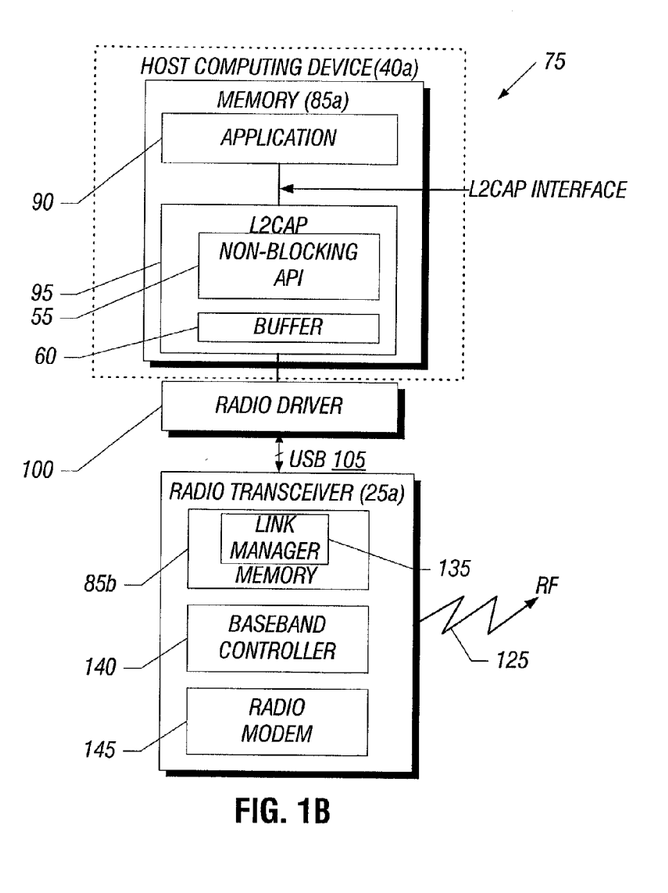
FIG. 1B is a schematic depiction of an embodiment of the present invention.

Consistent with an embodiment of the present invention, a short-range wireless communication device 75, shown in FIG. 1B includes a host computing device 40a that may communicate with a radio transceiver 25a. The host computing device 40a may include a memory 85a storing an application 90 and a local link control and adaptation protocol (L2CAP) 95. In one embodiment, the L2CAP 95 may support higher level protocol multiplexing, packet segmentation and reassembly, and conveying of quality of service information. The application 90 may assist in data packet formation and composition.

The radio transceiver 25a may comprise any one of many available communication interfaces. The host computing device 40a may further include a radio driver 100 to operate the radio transceiver 25a. That is, in order to properly interface with the host computing device 40a, the radio driver 100 may adapt the radio transceiver 25a. For example, the radio driver 100 may adapt the radio transceiver 25a because a different type of an internal bus, such as a serial or parallel bus may be used for the purposes of internal communications and/or communications with external devices.

Using a universal serial bus (USB) driver within the radio driver 100, the host computing device 40a may adapt the radio transceiver 25a according to a USB interface 105 in one embodiment. The USB driver and interface 105 may be devised following a specification entitled "Universal Serial Bus Revision 2.0 Specification, 2000" set forth by the USB Implementers Forum.

When activated, the radio transceiver 25a may provide radio frequency (RF) communications 125 to one or more targeted receivers. The radio transceiver 25a may include a memory 85b storing a link manager 135 to cooperatively interact with the host computing device 40a in order to furnish the RF communications 125. When executed, the link manager 135 may enable a communication to the host computing device 40a over the USB interface 105 in some embodiments. For the purposes of processing digital communications, in one embodiment, the radio transceiver 25a may further incorporate a baseband controller 140. Likewise, to generate and/or receive RF communications 125, a radio modulator-demodulator (MODEM) 145 may also be provided.

The L2CAP 95 may use an interface (e.g., code), such as a non-blocking application programming interface (API) 55 and a buffer 60 to enable a wireless transfer of data. The non-blocking API 55 may control the buffer 60 for concurrently keeping at least one data payload pending while communicating another data payload. In some embodiments, as an example, first and second data payloads may be appropriately processed before being transferred in multiple payloads over a communication channel.

Essentially, in one embodiment of the present invention, first and second data payloads may be provided at the transceiver 25 for wireless transfer over a short-range communication link to a target transceiver, which is physically separated from the transceiver 25. While the first data payload is being transferred on a communication channel within a data streaming session over the short-range communication link according to the non-blocking API 55, the second data payload may be concurrently buffered in the buffer 60.

That is, using the non-blocking API 55 in conjunction with the buffer 60, a non-blocking transfer of the first data payload may occur during the data streaming session according to one operation in an embodiment of the present invention. In this context, the non-blocking transfer of the first data payload entails not waiting for transmission of the first data payload to complete via receipt of an acknowledgement from the target transceiver before transferring the second data payload. To determine whether or not a data transfer operation was successful during the data streaming session, the non-blocking transfer may be monitored by the application 90 using an interrupt, callback, or other notification mechanism. In this way, data may be efficiently transferred, such as in a data write or read operation which may be enabled because the second data payload may be communicated from the transceiver 25 without waiting for a transmission of the first data packet to complete at the target transceiver.

More specifically, such monitoring, in some embodiments, may determine whether a problem occurred with the transmission of the data packets during the data streaming session. When a problem occurs, an event including at least one of a first or a second indication for the transmission of the first data packet, for example, may be immediately reported instead of waiting until the end of the data streaming session. In one case, an event may include incoming messages, such as indications, confirmations, requests, responses, and signals caused by timing expirations. Responsive to the first indication present in the event, the second data payload may be either resent, or alternatively a recovery may be undertaken based on the second indication.

Using a non-blocking data transfer protocol, in one case, one or more data payloads may be placed in the buffer 60. As an example, placing the data payloads in the buffer 60 may involve subsequent posting of multiple packets to the communication interface 50 for a transmission over a communication channel. The data payloads may be kept concurrently pending in the buffer 60, before the transmission. In one embodiment, a short-range communication channel may enable a radio link on a microwave carrier frequency (e.g., 2.4 gigahertz (GHz)) capable of a transmission range about ten meters with a transmit power of about one milliwatt between a master wireless communication device to a slave wireless communication device.

In one embodiment, a payload of data may include one or more packets being exchanged between at least two wirelessly networked devices or systems. The wireless communication device 20 may be based on any one of a variety of conventional radio links that may be utilized for short-range wireless communications. One radio link is the Bluetooth radio link, which is a short-range, cable replacement, radio technology. Bluetooth standards are set forth by the Bluetooth special interest group (SIG) in a specification entitled "Specification of the Bluetooth System, Volume 1: Core and Volume 2: Profiles," version 1.1, February 2001.

Using the 2.4 GHz instrumentation, science, medical (ISM) unlicensed band, a Bluetooth standard-based wireless communication system may provide a point-to-point connection between two Bluetooth units involved in a communication session and a point-to-multipoint connection among a plurality of Bluetooth units. Two or more such units sharing the same channel form a "piconet," where the unit controlling the traffic is the master and the other units are slaves. There may be multiple piconets with overlapping coverage areas, a configuration called a "scatternet." Each piconet may only have one master. Up to seven slaves, however, may participate in different piconets on a time-division multiplex basis, and a master in one piconet may be a slave in another.

The Bluetooth wireless communication system may employ channels that use a frequency-hop/time-division-duplex (FH/TDD) technique, accommodating transfer of both voice and data. The voice and/or data to be transmitted as portioned into packets. A number of packet types (with different lengths, as example) may be defined. Depending on packet length, a packet may be transmitted in one, three or five slots, using a different hop frequency for each slot. For this purpose, two types of physical links including a synchronous connection-oriented (SCO) link and an asynchronous connectionless link (ACL) may be used. The SCO link is a symmetric, point-to-point link between the master and a specific slave. The ACL, however, provides a packet-switched connection between the master and all active slaves in a piconet. Regardless, a status indication such as an automated repeat request (ARQ) scheme may signal to the master the status of the previous packet transmission. A standard Bluetooth packet includes a 72-bit access code, a 54-bit packet header, and the payload, which can be up to 2,745 bits long, although the format generally depends on the packet type.

Figure 2:
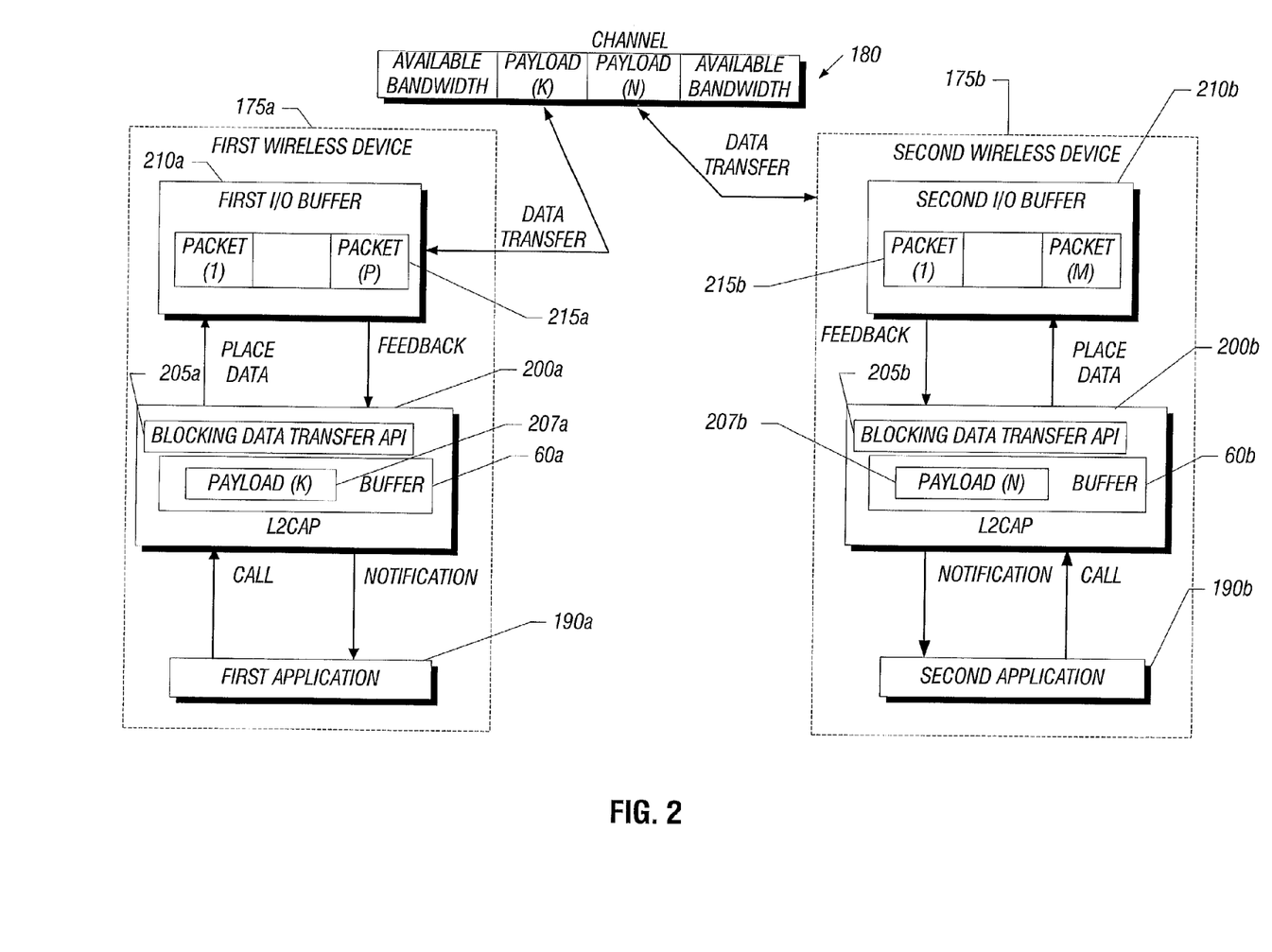
FIG. 2 shows blocking and non-blocking data transfers according to one embodiment of the present invention.

Based on one embodiment of the wireless communication device 20 of FIG. 1A, a first wireless device 175a may communicate with a second wireless device 175b on a wireless communication channel 180 in FIG. 2. The first wireless device 175a may employ a first application 190a to operate the first wireless device 175a through L2CAP 200a. Here, the L2CAP 200a comprises a blocking data transfer API 205a so that the first application 190a in the first wireless device 175a waits for each payload transmission to complete before starting the transmission of a next payload. That is, before placing a payload (K) 207a in a first input/output (I/O) buffer 210a, the L2CAP 200a in the first wireless device 175a waits for feedback to arrive from the second wireless device 175b acknowledging receipt of a preceding data packet (P) associated with a previous payload (K−1) in some embodiments of the present invention.

In operation, the first application 190a makes a call to the L2CAP 200a for initiating a data transfer operation. In response to the call, the L2CAP 200a may use a buffer 60a to enable a blocking data transfer from the first I/O buffer 210a onto the wireless communication channel 180. For example, data packets 215a associated with the payload (K) 207a may be communicated at a particular time determined by the blocking data transfer API 205a. Another payload is not processed for transmission because the first application 190a waits for the acknowledgment (e.g., notification) to arrive from the second wireless device 175b confirming the receipt of the data packet (P).

However, additional payloads needing a wireless transfer may be prepared by the first application 190a. When an acknowledgement for the payload (K) 207a is received, a next payload (K+1) may be afterwards buffered in the buffer 60a by the first application 190a in response to the call to the L2CAP 200a. The first application 190a may process payloads for a subsequent placement into the first I/O buffer 210b.

While the wireless device 175b may also use the wireless communication channel 180 for wireless communications, the second application 190b may operate the second wireless device 175b according to L2CAP 200b. In the illustrated embodiment, the L2CAP 200b comprises a blocking data transfer API 205b. When the second application 190b makes a call to the L2CAP 200b for a wireless transfer operation, a buffer 60b may enable transferring of data packets associated with a payload from the second I/O buffer 210b into the wireless communication channel 180. In operation, a payload (N) 207b may be buffered in the buffer 60b while data packets 215b associated with the payload (N) 207b are being transferred. Payloads are loaded into the second I/O buffer 210b in response to the call to the L2CAP 200b by the second application 190b. The second application 190b may process additional payloads while waiting for a notification to arrive on the payload (N) 207b.

Alternatively, according to another embodiment of the wireless communication device 20 of FIG. 1A, the first and second wireless devices 175a, 175b may transfer data in a non-blocking manner in which two or more payloads may be kept concurrently pending for their transmission in the buffers 60a, 60b, respectively. Using the non-blocking transfer, multiple payloads may be buffered and processed for subsequent transmission. That is, the completion of the transmission of data packets associated with one payload is decoupled with buffering and transmission of additional payloads, saving data communication overhead.

Specifically, in this case, obviating a waiting period for payload buffering at the second wireless device 175b which is operating in a non-blocking manner. That is, before buffering a payload (N+1) in the buffer 60b, the second wireless device 175b may not wait for transmission of a previous payload (i. e., data packets (1) and (M) 215b) to complete at the second input/output (I/O) buffer 210b in accordance with some embodiments of the present invention.

Figure 3A:
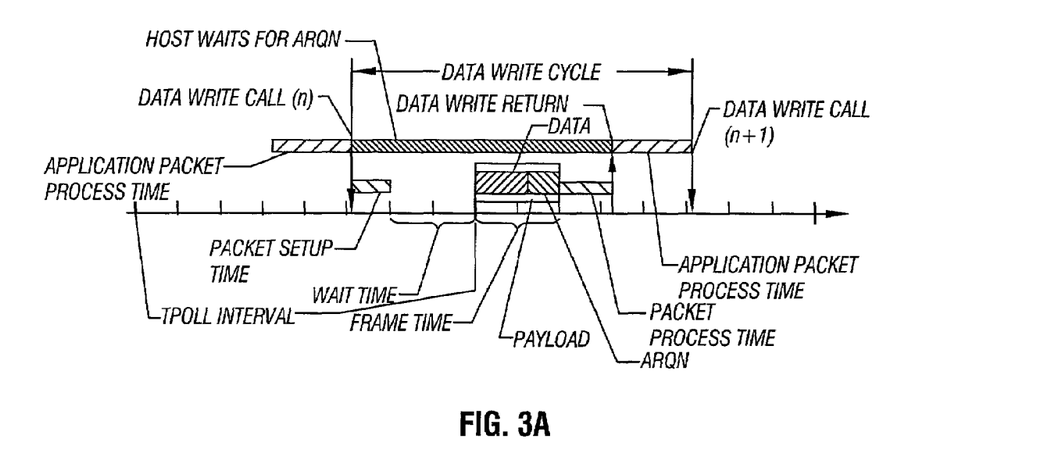
FIG. 3A is a hypothetical timing chart showing blocking master-to-slave data transfer in wireless communications over a short-range communication link in accordance with one embodiment of the present invention.

Referring to FIG. 3A, a hypothetical timing chart shows a blocking form of master-to-slave data transfer in wireless communications over a short-range communication link in accordance with one embodiment of the present invention. A master device such as the host computing device 40a of FIG. 1B may periodically poll one or more slave devices in some embodiments of the present invention. As shown in FIG. 3A, the host computing device 40a may poll a slave device such as the first wireless device 175a and/or the second wireless device 175b of FIG. 2. When the host computing device 40a desires transfer of a data payload to the slave device, the application 90 may issue a data write call (n) to the L2CAP 95 for loading the data payload into the buffer 60 (FIG. 1), beginning a data write cycle shown in FIG. 3A.

Responsive to the data write call (n), the host computing device 40a may prepare the data payload for transfer as one or more data packets. A packet setup time is indicated for such purpose in FIG. 3A. Before may be able to send the data packet, the host computing device 40a may wait for a certain period of time for access to the channel 180 indicated as a wait time marked in FIG. 3A. Within a frame time indicated in FIG. 3A, the data packet may be sent with an acknowledgement, such as indication (ARQN) for an eventual return, informing about the transfer of the data packet.

However, some amount of time, e.g., depicted as a packet process time may be consumed before the application 90 may process the data packet. To this end, after returning from the data write call (n), in one embodiment, an application packet process time may be allocated. Once the data write cycle ends, another data write call (n+1) may be handled accordingly by the host computing device 40a.

Typically, a host of data transfer parameters may be defined for a wireless communication over the wireless communication channel 180 in one embodiment of the present invention. Among other data transfer parameters, a data flow rate may be set, e.g., as a token rate, in conjunction with a latency time, a delay variation, and a flush timeout may be specified for the blocking form of master-to-slave data transfer. Given these parameters, the application 90 (FIG. 1) may meet the specified token rate by posting an appropriately-sized payload at a regular interval, in one situation.

To meet these data transfer parameters, the baseband controller 140 may transfer one packet over the communication channel 180 at a specified regular interval, such as a polling period. For example, within a Tpoll interval a master device, such as the host computing device 40a of FIG. 1B may periodically poll one or more slave devices in some embodiments. The Tpoll interval may be derived with a periodic value based on the token rate and latency values to meet the specified data flow rate. On average, in this example, it may take some time ("packet setup time") for a data write primitive to setup a packet for transmission, or to process a received acknowledgement. In addition, the application 90 may take a finite amount of time ("packet process time") to process the next packet for a transmission.

Having a short frame clock, the USB interface 105 (FIG. 1B) takes a predetermined amount of time that may be allocated to get a packet across the USB interface 105 to the HCI 35. In this example, a time has been allocated for the packet setup and packet processing. In both cases, however, the time from the end of a frame to making the data write call for the next packet may be devised to be substantially constant.

In this way, the application 90 may quickly synchronize with the Tpoll interval because the host computing device 40a is practically blocked while waiting for the data write call (n) to return.

As described, the host computing device 40a may wait for a certain period of time, such as the wait time, which may be determined by examining a duration for which a packet is queued at the baseband level, waiting for its Tpoll slot to arrive. In addition, a "frame time" is indicated as the time available for at least one transmission. If the data write cycle time takes more time than the Tpoll interval, however, there may be a data underrun in some cases, affording a short duration for the application 90 to prepare the next packet and write the data.

Whether there is enough payload posted for one packet of data with each call to a data write primitive or for multiple packets, a turn around time for the application 90 getting the next packet posted is defined by the rules presented above in one embodiment.

By allowing multiple payloads to be posted on a single channel (i.e., double buffering), "the packet process time" of the application 90 for a subsequent packet may be reduced in some embodiments of the present invention because that processing may be done while waiting for an acknowledgement.

Figure 3B:
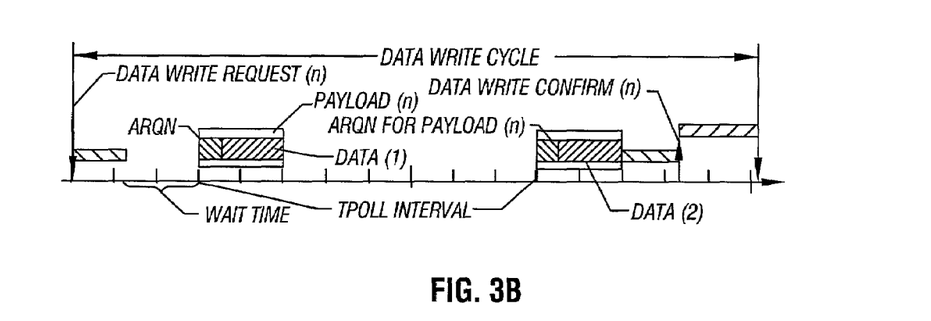
FIG. 3B is a hypothetical timing chart showing blocking slave-to-master data transfer in wireless communications over a short-range communication link in accordance with one embodiment of the present invention.

Turning to FIG. 3B, a hypothetical timing chart shows a blocking form of slave-to-master data transfer in wireless communications over a short-range communication link in accordance with one embodiment of the present invention. Within a data write cycle of FIG. 3B, a data request (n) may be issued to the master device by the slave device for transferring data from a slave device to a master device. Before forming a payload (n) including a slave-to-master packet "DATA (1)," the slave device may wait for some time based on a particular situation. Such a wait is indicated as a "wait time" in FIG. 3B. At the beginning to the Tpoll interval, the payload (n) may be transmitted to the master device. An acknowledgement, (e.g., an ARQN bit), indicating at least one of a successful transmission or an error in the transmission, however, may not reach at the slave device from the master device until a next master-to-slave packet, "DATA (2)." Once the acknowledgement is examined at the slave device, a data write confirmation (n) may be provided back to the master device, which appropriately manages the data write confirmation (n), ending the data write cycle.

As discussed, unlike the turn around time for master-to-slave payloads, the ARQN bit of the slave-to-master packet "DATA (1)" may not arrive until the next master-to-slave packet, "DATA (2)," in a subsequent Tpoll period. This means that the data packet to an acknowledgment (ACK) packet delay for a slave-to-master transfer may be separated by the Tpoll interval time, significantly increasing the data write cycle time, in this example. This difference in data write cycle times depending on the direction of the data transfer may be taken into account. One way to get around these constraints entails returning immediately (i.e., without waiting for a transmission of the slave-to-master packet "DATA (1)" to complete by way of receiving the ACK packet delay) from placing a payload into the buffer 60 (FIG. 1), allowing problems associated with the streaming of data to be reported with an event.

Figure 4A:
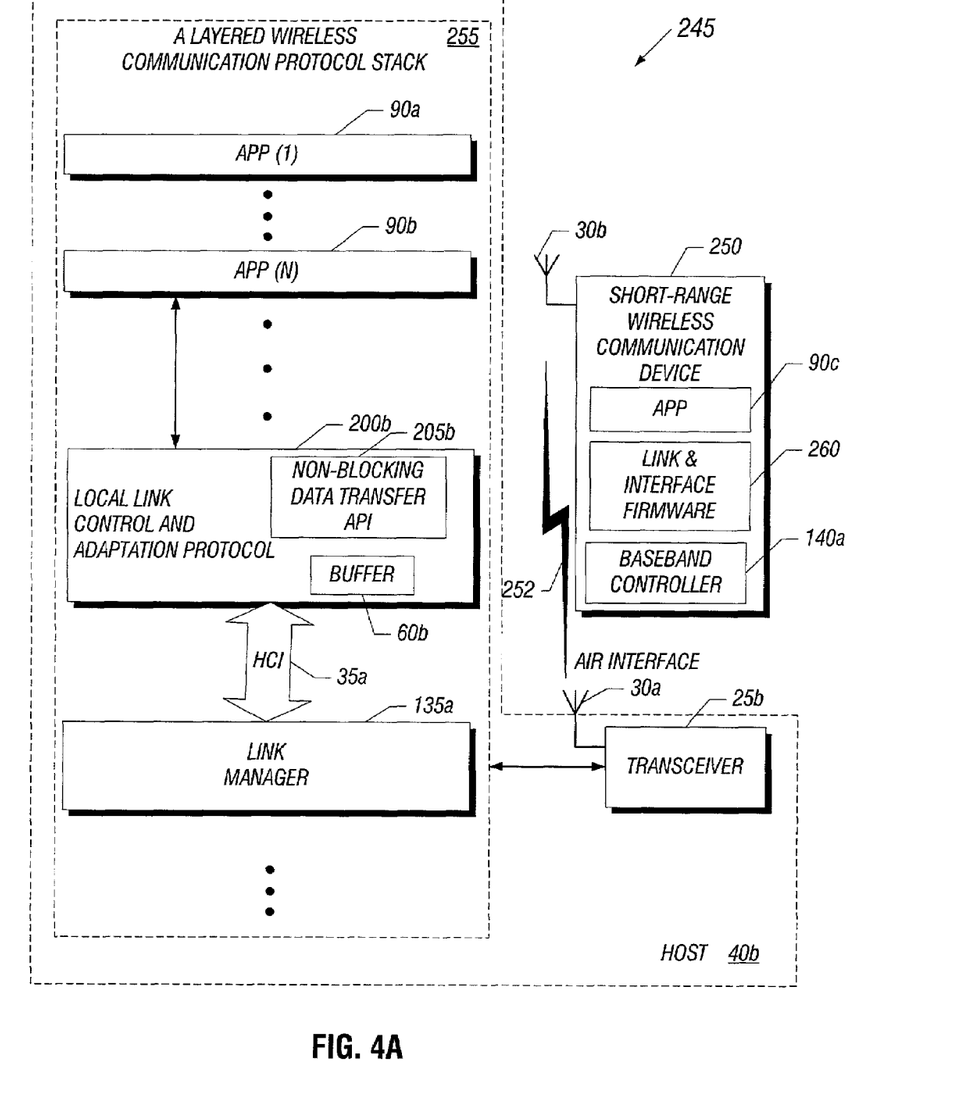
FIG. 4A is a schematic depiction of a wireless short-range communication system in accordance with one embodiment of the present invention.

In a short-range wireless communication system 245 as shown in FIG. 4A, a host device 40b may wirelessly communicate to a short-range wireless communication device 250 over an air interface 252. The host device 40b may comprise a transceiver 25b operable according to a layered wireless communication protocol stack 255. An antenna 30a may be operably coupled to the transceiver 25b for receiving and/or transmitting wireless communications in one embodiment of the present invention.

The layered wireless communication protocol stack 255 may include a plurality of application (APP) programs 90a through 90b, L2CAP 200b, and a link manager 135a. A host controller interface (HCI) 35a may enable interfacing of the L2CAP 200b with the link manager 135a. In this way, in the illustrated embodiment, the transceiver 25b may operate based on the layered wireless communication protocol stack 255 when over the air interface 252, the short-range wireless communication device 250 may communicate with the host device 40b. To this end, short-range wireless communication device 250 may comprise an antenna 30b, an application program 90c, a baseband controller 140a, and link-interface firmware 260.

Figure 4B:
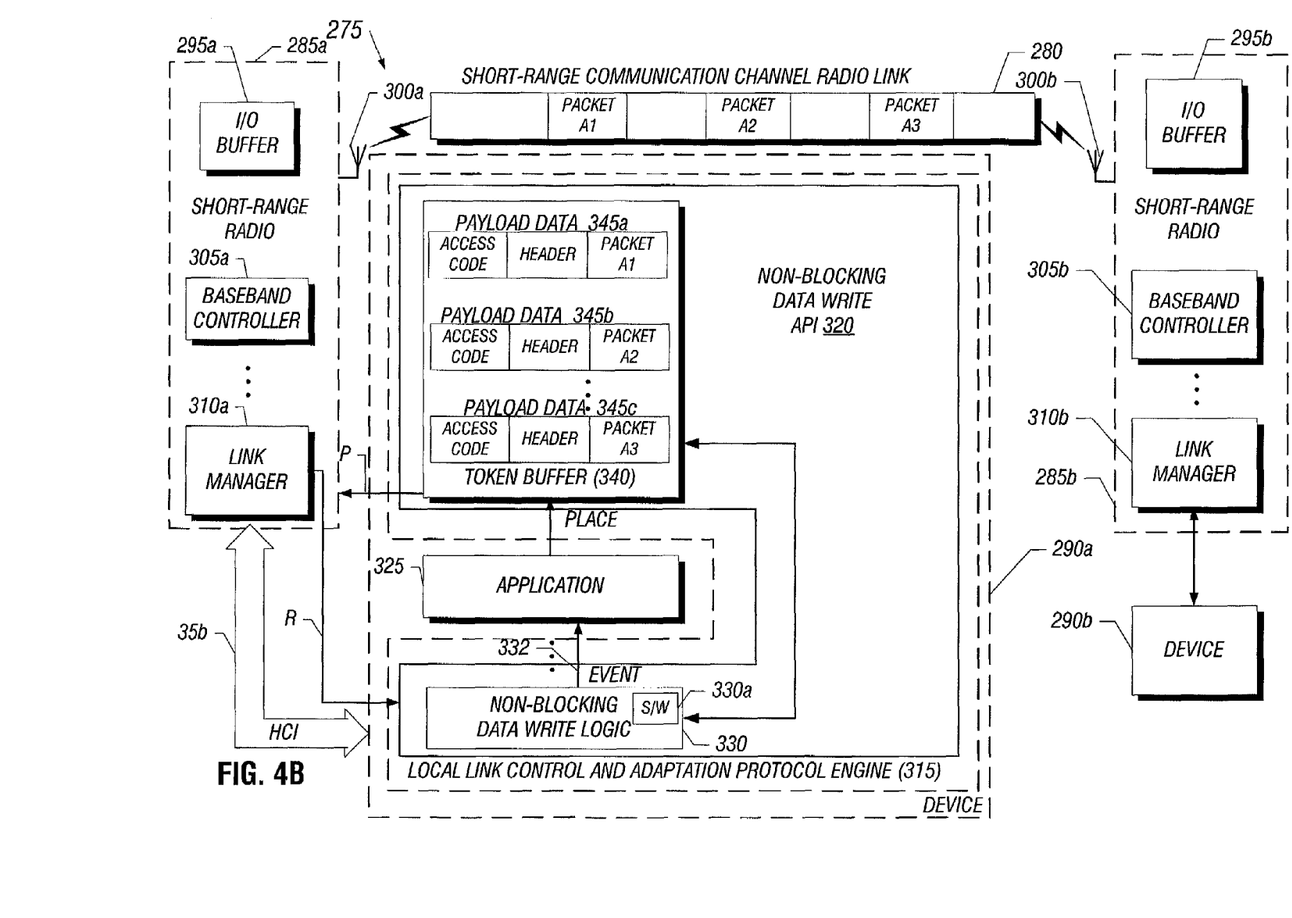
FIG. 4B is a schematic depiction of the wireless short-range communication system of FIG. 4A that enables wireless communication of multiple data units over a short-range radio link in accordance with one embodiment of the present invention.

A wireless communication system 275 shown in FIG. 4B may enable a wireless transfer of multiple data units over a short-range communication channel radio link 280 according to an embodiment of the present invention. The wireless communication system 275 comprises a short-range radio 285a operably coupled to an associated device 290a via a HCI 35b for wirelessly communicating with a short-range radio 285b operably coupled to an associated device 290b. Each of the short-range radios 285a and 285b may include a respective I/O buffer of 295a or 295b to transmit or receive voice and/or data via dedicated antennas 300a, 300b, respectively. In a shared fashion, the communicated voice and/or data may be wirelessly carried over the short-range communication channel radio link 280. To digitally process the communicated voice and/or data, the short-range radio 285a may further incorporate a baseband controller 305a, and the short-range radio 285b may include a baseband controller 305b. For the purposes of interacting with the respective and associated devices 290a and 290b, in one embodiment, each of the short-range radios 285a and 285b may use link managers 310a, 310b, respectively.

To highlight some features of some embodiments of the present invention, only relevant components are illustrated in FIG. 4B according to one embodiment of the device 290a. Without limiting the scope of the present invention, however, the device 290b may comprise similar and/or additional components following the configuration of the device 290a in one embodiment. The device 290a may include a non-blocking data write API 320 within a local link control and adaptation protocol (L2CAP) engine 315. Moreover, an application 325 may provide an interface between to a non-blocking data write logic 330 and a token buffer 340 for the non-blocking data write API 320. In essence, the non-blocking data write API 320 may enable the non-blocking data write logic 330 to control the token buffer 340 via the application 325.

Each payload 345 may include at least one associated data packet from data packets A1 through A3, which may temporarily be placed in the token buffer 340 before being sent further onto the short-range radio 285a. More specifically, the token buffer 340 may post the payloads 345 to the link manager 310a for subsequent propagation to the I/O buffer 295a. Eventually, in a desired data streaming session, the data packets A1 through A3 may be transmitted over the short-range communication channel radio link 280.

As illustrated, the non-blocking data write logic 330 is utilized within the L2CAP engine 315 of FIG. 4B based on the layered wireless communication protocol stack 255 shown in FIG. 4A. From the non-blocking data write logic 330, an event indicating that the token buffer 340 is currently at an empty state may be provided to the application 325 in some embodiments. Of course, some embodiments may involve use of other layers within the layered wireless communication protocol stack 255. In addition, while embodiments of the present invention are described in connection with payloads including data packets, the present invention is applicable to any type of data or media and with any number of data units.

A master device may manage multiple slave devices according to one embodiment of the present invention. The master device may communicate with slave devices sequentially, such as by polling each slave device in a round robin manner. Of course, depending upon a particular application other appropriate mechanisms for communicating with the slave devices may be deployed in some embodiments. In one case, for example, a piconet may include a particular master host device that may poll a plurality of slave radio devices associated with the piconet. Based on one embodiment of the present invention, in a particular data streaming session, the short-range radio 285b may become a slave device to the device 290a. In one embodiment, any one of a plurality of networked devices or systems in the piconet, i.e., the devices 290a and 290b and the short-range radios 285a and 285b may be designated or arbitrated to be either a master or a slave device.

In one case, a switch command may be applied to each of the plurality of networked devices or systems in the piconet that needs to change its status from a master to a slave device or vice versa. Upon initialization, in a piconet comprising at least two laptop computers, both laptop computers may behave as masters, as an example. After initialization, both the laptop computers may negotiate with one another for arriving at an agreement as to the control of the piconet within the particular data streaming session. Based on the negotiations between the two laptop computers, any one of the two laptop computers may take over as a master device.

After posting the contents in the token buffer 340 to the short-range radio 285a for transfer over the short-range communication channel radio link 280, the device 290a may not wait for an acknowledgment before sending the new contents loaded in the token buffer 340. That is, before the acknowledgment is received from the short-range radio 285b over the short-range communication channel radio link 280, the short-range radio 285a may continue transferring the new contents of the token buffer 340. After receiving the acknowledgment indicating a problem in connection with the transmission of the data transferred prior to the new contents, however, such data may be resent in some embodiments.

According to one embodiment of the present invention, the contents of more than one buffer, such as similar to the token buffer 340 may be queued. In any event, the contents present in the token buffer 340 may be kept pending concurrently for a later transfer without waiting for a receipt indicating a successful transmission of previous contents to the device 290a from the short-range radio 285b. When polled, such queuing of a first data unit along with a second data unit may pave the way to sending all the contents of the token buffer 340 over the short-range communication channel radio link 280 in a data streaming session rather than sending them intermittently on a packet-to-packet basis only after receiving each corresponding acknowledgement.

First, the application 325 places one or more payloads each having at least one data packet in the token buffer 340 for the short-range radio 285a according to one embodiment of the present invention. In response to a request, the application 325 may "PLACE" the data into the token buffer 340. Then the token buffer 340 may post "P" the available data to the short-range radio 285a. When finished transferring these data packets, the short-range radio 285a may generate a request "R" for additional data. The non-blocking data write logic 330 may generate a data streaming event 332 in response to any one of a number of possible indications, including an error, a success, and a threshold, according to one embodiment of the present invention, received from the radio 285a over the line R. More specifically, the data streaming event 332 may keep track of the wireless communication because the non-blocking data write logic 330 may control the token buffer 340 via the application 325.

In some embodiments, the "R" and "P" communications may be undertaken over the HIC 35b in a handshaking operation. The non-blocking data write logic 330 may manage the handshaking operation while handling the data when the short-range radio 285a interfaces with the device 290a via the HCI 35b. As a result, the data streaming event 332 may be provided to the application 325. In one embodiment, more than two buffers 340 full of data may wait in a queue. When the data is sent, the data streaming event 332 may indicate that more data is needed in the token buffer 340, or alternatively availability of data may be tracked to indicate that the token buffer 340 is empty or about to be empty. For example, if the contents of the token buffer 340 have dropped below a certain predetermined threshold, more data may need to be made available to continue streaming data in the data streaming session. In this case, the token buffer 340 is indicated to be empty by the data streaming event 332.

In operation, the short-range communication channel radio link 280 may connect the short-range radios 285*a* and 285*b*, for example, when the device 290*a* is operating the short-range radio 285*a*. Over the short-range communication channel radio link 280, the short-range radios 285*a* transmits a radio frequency signal to the short-range radio 285*a* connected to the device 290*b*. According to some embodiments of the present invention, the short-range radios 285*a* and 285*b* may be set to a nominal range of 10 meters augmentable with an external power amplifier to up to 100 meters. Seventy-nine hop frequencies are utilized beginning at the lowest frequency which is 2402 MHz and each of the 79 hop frequencies is 1 MHz above the next lower frequency. A connection may be made between the two short-range radios 285*a* and 285*b* by sending a page message. A page message may include a train of 16 identical page messages on 16 different hop frequencies.

In operation, the wireless communication system 275 may use the SCO link for point-to-point, full duplex links, normally used in voice communication. For the embodiment described herein, the ACL link is used. The ACL link provides one frame duration links with full duplex communications. The ACL link communications use a time division duplex scheme. A first slot provides a transmission from the master to the slave and a second slot provides a transmission from the slave to the master. Each slot is transmitted on a different hop frequency. The device initializing the transmission is designated the master and the device receiving the transmission is designated the slave.

Each of the two short-range radios 285*a* and 285*b* may include additional circuitry for performing the baseband processing and the basic protocols close to the physical layer such as the error correction coding and an automatic repeat request (ARQ). The ARQ provides an acknowledgement to the master, in response to a transmission in one slot, in the next following slot which comes from the slave and vice versa. The wireless communication system 275 may further use appropriate modulation with data and symbol rate of one megasamples per second.

Figure 5:
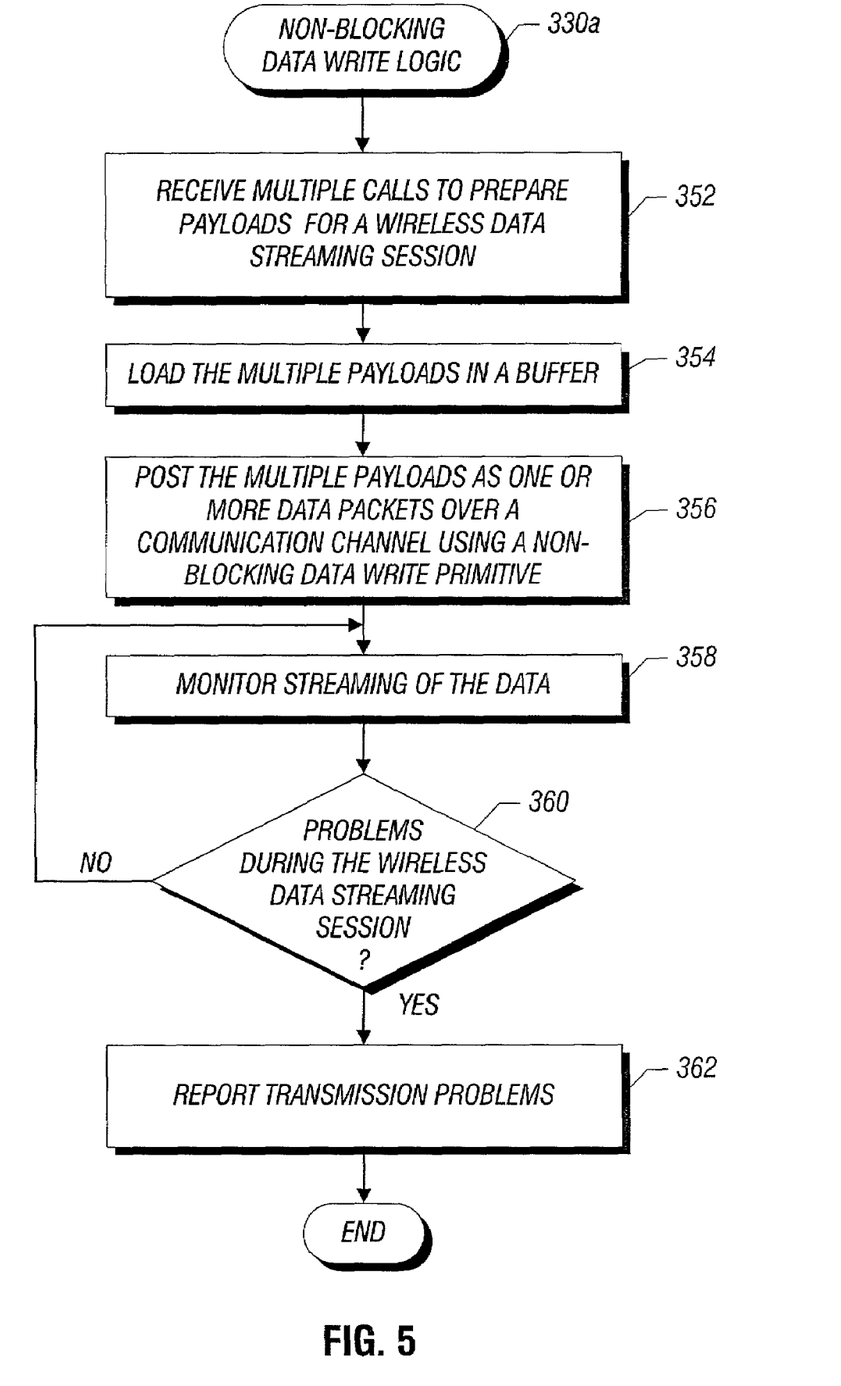
FIG. 5 is a flow chart for software, which accompanies an embodiment of the present invention.

Non-blocking data write logic software (S/W) 330*a* as shown in FIG. 5 may receive multiple calls to prepare payloads for a wireless data steaming session at block 352. In response to the calls, multiple payloads may be loaded into the token buffer 340 at block 354. Using a non-blocking data write primitive (e.g., code), at block 356, the multiple payloads may be posted as one or more data packets over a communication channel, such as the short-range communication channel radio link 280 of FIG. 4B. Streaming of the data, i.e., the data packets associated with multiple payloads may be monitored at block 358. A check at diamond 360 may determine a particular problem, such as an incomplete transmission during the wireless data streaming session. When a problem occurs, it may be appropriately reported at block 362. Regardless, the non-blocking data write logic software 330*a* may continue to monitor the streaming of the data.

In one embodiment, the non-blocking data write primitive used at block 356 may include features within the L2CAP engine 315 of FIG. 4B to support non-blocking data writes, which may have one or more associated parameters. Namely, a channel identification (CID)) parameter, a length parameter, an address of an I/O buffer, a size parameter, and a result parameter, may be utilized as examples. The CID parameter may represent a local end-point of the communication channel. The length parameter may indicate size, in bytes, of the buffer 60 (FIG. 1) where data to be transmitted may be stored. The I/O buffer address of an input/output buffer, i.e., the first and second I/O buffers 210*a*, 210*b* (FIG. 2) may be used to store data, such as a message in one embodiment.

Using the non-blocking data write logic software 330*a*, the feedback, e.g., a non-Blocking write response from the receiving end short-range radio among the short-range radios 285*a* and 285*b* may be characterized by a size parameter indicating the number of bytes transferred. A result parameter (i.e., concerning a transmission of the data) may include a value to note the status of the transmission. The value may be provided in a hexadecimal format to the non-blocking data write logic software 330*a* in one embodiment. Examples of the value in the result parameter include an indication, indicating a successful write, and another indication to show whether the buffer 60 is full, a partial transfer, or the size being not equal to the length. Likewise, a non-blocking write event for the token buffer 340 (FIG. 4B) may be characterized by a host of parameters, such as CID, size, and result. While the CID, i.e., the channel ID may represent a local end-point of the communication channel, the size parameter may indicate the number of bytes remaining in the token buffer 340 that were not transmitted, for example, in a particular data streaming session.

For the result parameter, a value may include an indication when the token buffer 340 may be empty, and another indication when a threshold may be reached for the token buffer 340, a different indication when an error occurs if a flush timeout is expired, a unique indication when another error occurs if a link termination is detected. Following the above description, in one embodiment, a read data primitive may be devised to work for reading payloads that were transmitted with the non-blocking data write primitive at block 356.

For specifying a quality of service, in some embodiments, a token bucket threshold parameter may be provided. This value may cause a non-blocking write event (e.g., the token buffer threshold is reached) to be generated when tokens available in the token buffer 340 are not commensurate with the token bucket threshold parameter. In one case, the token bucket threshold may be defined in four bytes or octets. A value of this field represents the size of the token bucket threshold in bytes. A non-blocking write event may be generated when the number of available tokens increases to a value greater than the token bucket threshold. Such a value represents that a token bucket threshold event is not desired because this is the default value in some embodiments.

Figures 6A, 6B:
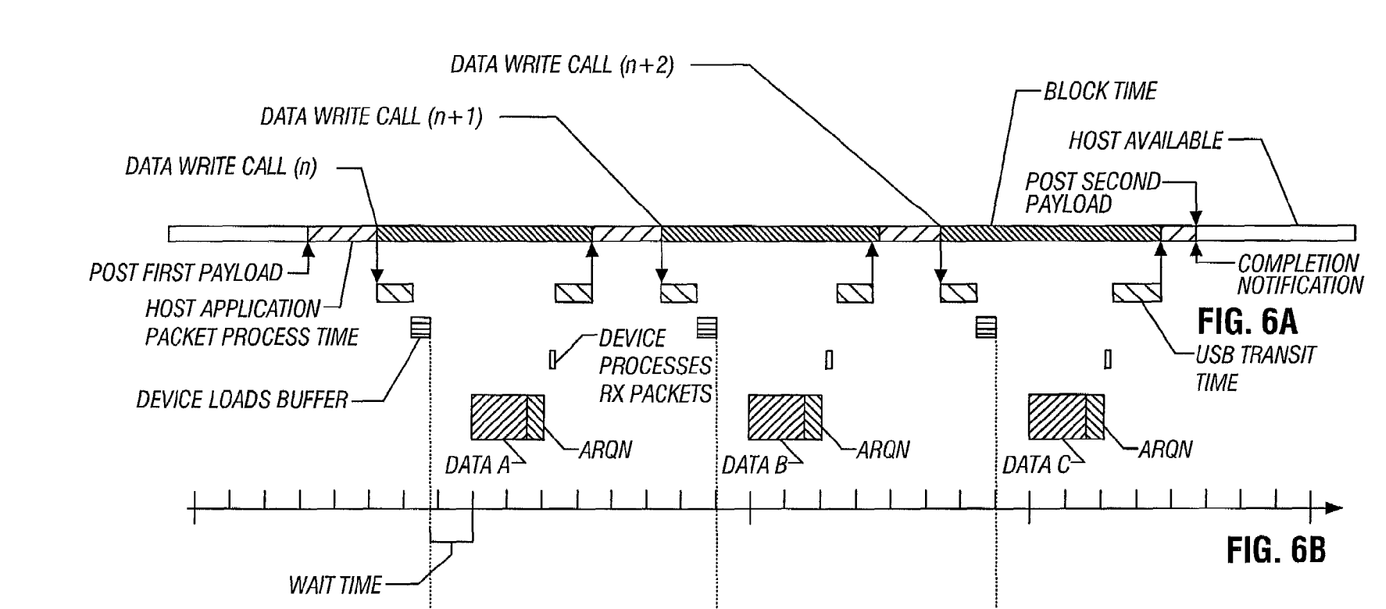
FIGS. 6A-6C are hypothetical timing charts showing blocking master-to-slave transfer of multiple payloads including data packets over the short-range radio link in the short-range communication system of FIG. 4B according to one embodiment of the present invention.
Figure 6C:
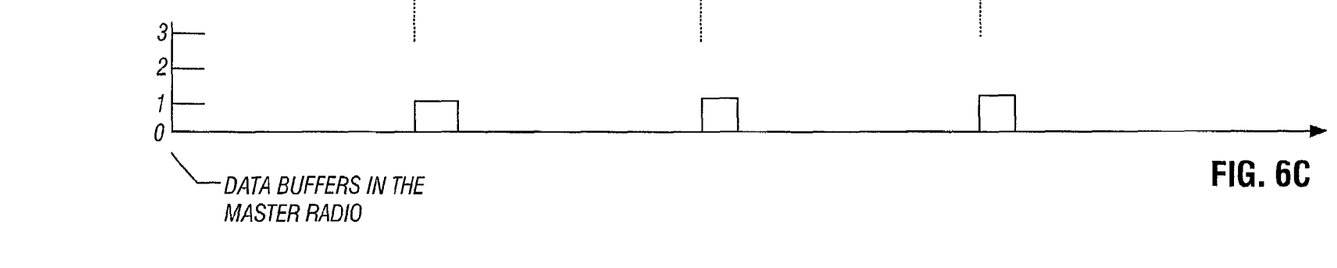

Transmission of multiple payloads including a first payload comprising three data packets is illustrated next in two different examples according to one embodiment of the present invention. In the first case (i.e., blocking) as shown in FIGS. 6A-6C, a host waits for each data packet to complete before it can schedule a next payload, expecting a completion notification for the last data packet of a previously transmitted payload. While the useful work done by the host 40 (FIG. 1) is shown in the FIG. 6A before each data write call (e.g., before data write call (n) a "host application packet process time" is indicated in FIG. 6A), the time spent waiting for the transmission is shown after each data write call (e.g., after data write call (n+2) a "block time" is indicated in FIG. 6A). A set of three data packets including "DATA A," "DATA B," and "DATA C" needing a wireless transfer may be kept pending along with the next payload, i.e., kept buffered while waiting for an acknowledgement or feedback to arrive on the previously sent data packet. This may save a significant amount of time that may otherwise be allocated later for performing pre-processing of each of the data packets "DATA A," "DATA B," and "DATA C" prior to sending these from the host 40 to the transceiver 25 of FIG. 1, as an example.

In FIGS. 6A-6C, a master device may periodically poll one or more slave devices. When the master device is provided with the data to be sent to a slave device (e.g., radio), the application on the master device may issue a blocking data write, i.e., blocking data write calls (n), (n+1), and (n+2) to post the first payload as shown in FIG. 6A. The short-range radio 285*a* may send the first data packet "DATA A" in FIG. 6B. When polled again, the second data packet "DATA B" is sent out, and finally the third data packet "DATA C" is transferred in response to being polled a next time again. An acknowledgment that is indicated in "the USB transmit time" as shown in FIG. 6A immediately after the "block time" may acknowledge the third data packet "DATA C." This acknowledgment may propagate up to the application 325 (FIG. 4B), indicating either a successful transmission or an error. Finally, the data to be transmitted may collect in data buffers, such as the I/O buffers 295*a* and 295*b* in a master radio as shown in FIG. 6C.

Consistent with one embodiment of the present invention, data may be loaded in the token buffer 340 until a buffer fill indication is provided to the application 325, temporarily stopping placement of the data. When loading of the data is halted, data may still be continuously posted out of the token buffer 340 to the short-range radio 285*a* for subsequent transfer over the short-range communication channel radio link 280. When the contents of the token buffer 340 drop below the certain predetermined threshold placing of the data may be restarted, avoiding emptying the token buffer 340 completely. Thus, a minimum level for the contents queued in the token buffer 340 may be maintained in some embodiments.

When the third data packet "DATA C" is transferred for wireless communications by the short-range radio 285*a*, an acknowledgment indicative of the completion of the transmission may be provided. Although FIG. 6C shows the token buffer 340 going empty after the third data packet "DATA C" is sent out (i.e., no data is available as indicated by missing data buffer block after the third box on the x-axis in FIG. 6C), but the short-range radio 285*a* may wait for a duration to send the data over and get the acknowledgment back. At that time, a blocking event may be provided to the application 325 in the host device 290*a* for managing the data accordingly.

Figure 7A:
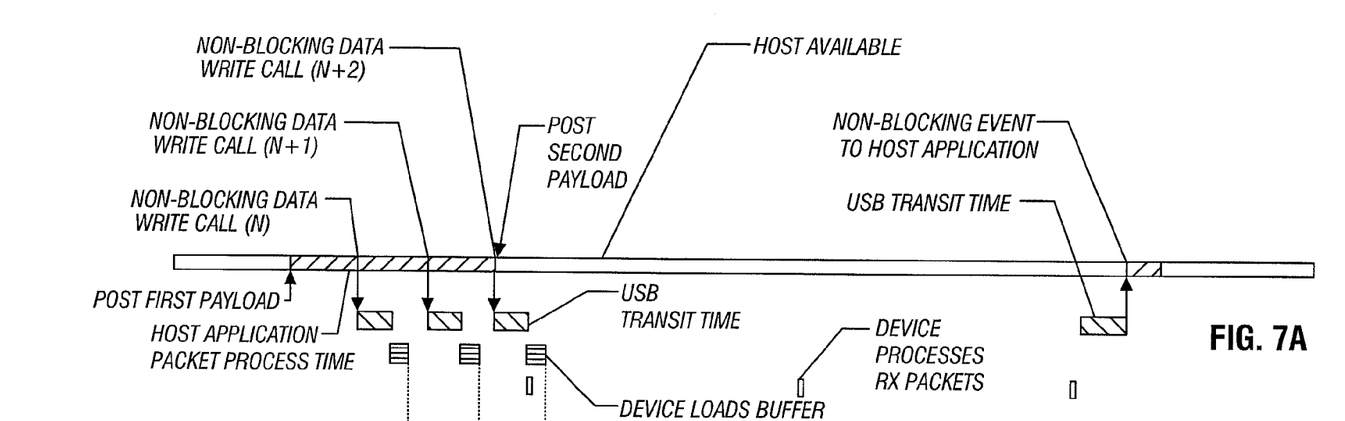
FIGS. 7A-7C are hypothetical timing charts showing non-blocking master-to-slave transfer of multiple payloads including data packets over the short-range radio link in the short-range communication system of FIG. 4B according to one embodiment of the present invention.
Figure 7B:
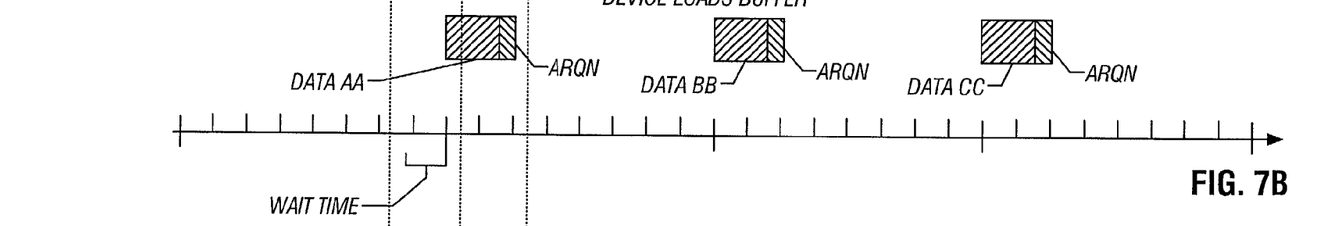
Figure 7C:
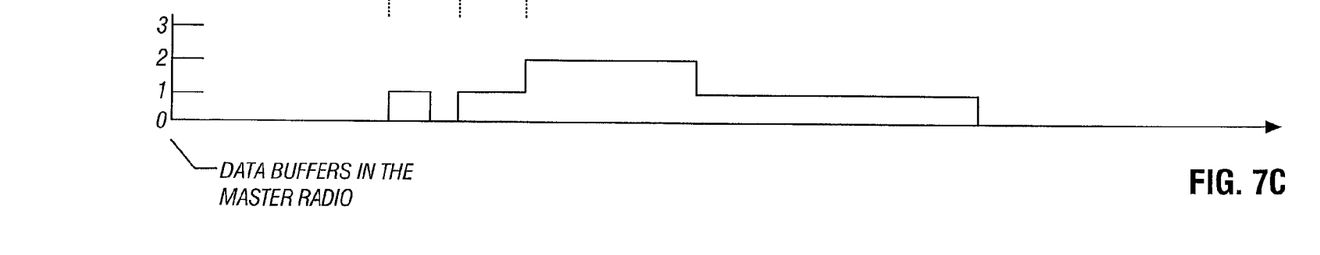

In the second case (i.e., non-blocking) as shown in FIGS. 7A-7C, the host may not have to wait for the transmission of each individual data packet to complete. The host may simply send the data packets to an associated radio, which buffers the data. When the associated radio has no more data to send, it informs the host with an event. Here the useful work done by the host may be same as the blocking case, however, unlike the blocking case time may not be spent waiting for the transmission confirmations.

As shown in FIGS. 7A-7C, a master device may periodically poll one or more slave devices. When the master device is provided with the data to be sent to a slave device (e.g., radio), the application 325 on the master device may issue a non-blocking data write, i.e., non-blocking data write calls (n), (n+1), and (n+2) as shown in FIG. 7A. In one case, three data packets "DATA AA" "DATA BB," and "DATA CC" belonging to a first payload needing a wireless transfer may be kept pending along with other payloads including a second payload, i.e., buffered without waiting for an acknowledgement or feedback on the previously sent data packet to arrive because a buffer is made available for simultaneously queuing more than one payloads. This may save a significant amount of time that may otherwise be allocated later for performing pre-processing of each of the data packets "DATA AA" "DATA BB," and "DATA CC" prior to sending these from the host 40 to the transceiver 25 of FIG. 1, as an example. After the non-blocking data write call (N+2), the second payload may be posted because completion of transmission of data packets is decoupled with the posting of additional payloads that may be already buffered.

When polled, a master radio, e.g., the short-range radio 285*a* of FIG. 4B may first send the first data packet "DATA AA" in FIG. 7B. Then the second data packet "DATA BB" may be sent without waiting for transfer confirmations of the data packets "DATA AA" to arrive. Likewise, the third data packet "DATA CC" may be sent without waiting for transfer confirmations of the data packets "DATA AA" and "DATA BB" to arrive. In this way, a significant amount of post-transmission time may be made available for performing other tasks than waiting for the transfer of the data packets "DATA AA" "DATA BB," and "DATA CC" to complete.

However, before transfer, the data may collect in data buffers, such as the I/O buffers 295*a* and 295*b* in the short-range radio 285*a* as shown in FIG. 7C. When a data packet reaches at a target destination, an acknowledgment may be provided in the USB transmit time shown in FIG. 7A. This acknowledgment may propagate up to the application, 325 indicating the transmission is either completed successfully or with an error. Like the transfer of other data packets, when the third data packet "DATA CC" is transferred for wireless communications by the short-range radio 285*a*, an acknowledgment indicative of the completion of the transmission may be expected. For this purpose, a non-blocking event may be provided to the application in the host device 290*a*.

In some embodiments, both the blocking and non-blocking transfer of data may be selectively provided based on a predefined criterion. For example, based on a rate of errors derived from the acknowledgment received from the receiving short-range radio of the short-range radios 285*a* and 285*b*, the blocking or non-blocking transfer of data may be enabled. When a higher rate of errors than an error threshold is detected, the blocking transfer of data may be selected over the non-blocking transfer of data. Conversely, if a lower rate of errors than the error threshold is detected, the non-blocking transfer of data may be advantageously opted between the blocking and non-blocking transfer of data.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving a first and second data unit of a data streaming session to be transferred;
   transferring a first data unit as a non-blocking transfer;
   determining if an error occurred in said transmission of said first data unit;

transferring the second data unit as a blocking transfer if an error occurred in transferring the first data unit; and wherein in a blocking transfer a data unit is not transferred until an acknowledgment of a receipt of a previously streamed data unit is received and in a non-blocking transfer a data unit is transferred without waiting for an acknowledgment of receipt of a previously streamed data unit.

2. The method of claim 1, including:

buffering said second data unit at a source transceiver that initiates the transfer of said first and second data units to a destination transceiver.

3. The method of claim 2, including:

providing a non-blocking transfer of said first data unit during the data streaming session; and monitoring the non-blocking transfer to determine whether or not a data transfer operation was successful during the data streaming session.

4. The method of claim 3 wherein providing an indication includes providing an event including at least one of a first or a second indication for the transmission of the first data unit.

5. The method of claim 4, wherein in response to the event, performing at least one of sending said second data unit based on the first indication and undertaking a recovery based on the second indication.

6. The method of claim 3, including providing a data write in the data transfer operation.

7. The method of claim 6, wherein providing said data write including, placing one or more payloads of data in a buffer based on a non-blocking data transfer protocol.

8. The method of claim 7, wherein placing said one or more payloads of data in said buffer including posting each of said one or more payloads of data as one or more packets of data for transmission over said communication channel.

9. The method of claim 8, including:

using a local link control and adaptation protocol to keep said one or more payloads of data pending concurrently; and using said communication link to enable a short-range radio link on a microwave carrier frequency capable of a transmission range about ten meters with a transmit power of about one miliwatt between at least one master wireless communication device to at least one slave wireless communication device.

10. The method of claim 3, including providing a data read in the data transfer operation.

11. An apparatus comprising:

a wireless transceiver including a device to determine whether a problem has occurred with a non-blocking transmission of at least a first data unit during a data streaming session to a receiving unit and, if a problem is detected, to transmit a second data unit using a blocking transmission, wherein a blocking transmission requires an acknowledgement before transmission and a non-blocking transmission does not require acknowledgement.

12. The apparatus of claim 11, wherein said apparatus to transmit the first data unit without waiting for the transmission of the first data unit to complete at the receiving device.

13. The apparatus of claim 12, including an interface to enable a non-blocking data transfer of said first data unit, to provide the non-blocking transfer of said first data unit during a data streaming session and to monitor the non-blocking transfer to determine whether or not a data transfer operation was successful during the data streaming session.

14. The apparatus of claim 13, wherein said interface including a non-blocking data transfer logic to:

determine whether a problem occurred with the transmission of at least one of said first and second data units during the data streaming session; and if a problem occurs, report the problem instead of waiting until the end of the data streaming session by providing an event including at least one of a first or a second indication for the transmission of the first data unit.

15. The apparatus of claim 14, wherein said non-blocking data transfer logic to, in response to the event, perform at least one of sending said second data unit based on the first indication and undertaking a recovery based on the second indication.

16. The apparatus of claim 15 wherein said interface to:

use a local link control and adaptation protocol to keep one or more payloads of data concurrently pending in said buffer;

provide a data write operation to place said one or more payloads of data in said buffer based on the non-blocking data transfer logic;

post said one or more payloads of data as one or more data packets for transmission over said communication channel; and use said communication link to enable a short-range radio link on a microwave carrier frequency capable of a transmission range about ten meters with a transmit power of about one miliwatt between at least one master wireless communication device and at least one slave wireless communication device.

17. The apparatus of claim 16, wherein said interface to provide a data read operation based on the non-blocking data transfer logic.

18. A wireless communication system comprising:

an interface including a buffer to keep a first and second data units pending for transmission;

a wireless interface; and a transceiver, operably connectable to said wireless interface, said transceiver to transfer said first data unit by a non-blocking transmission during a data streaming session and, if a problem occurs, to transmit said second data unit using a blocking transmission, wherein a blocking transmission requires an acknowledgement before transmission and a non-blocking transmission does not require an acknowledgement.

19. The system of claim 18, wherein said interface to enable said first processor-based device to place said first data unit on a communication channel based on a non-blocking data transfer protocol.

20. The system of claim 19 wherein said non-blocking data transfer protocol to provide at least one of data write and data read operations over a radio link on a microwave carrier frequency capable of a transmission range about ten meters with a transmit power of about one miliwatt between at least one master wireless communication device to at least one slave wireless communication device.

21. A computer readable medium storing instructions that, if executed, enable a source transceiver to:

determine whether a problem occurred with a non-blocking transmission of at least one of a first and second data units during a data streaming session; and if a problem occurred, transmit said second data unit using a blocking transmission.

22. The medium of claim 21 storing instructions that, if executed, enable the source transceiver to:

buffer said second data unit at said source transceiver; and send said second data unit without waiting for transmission of the first data unit to complete at said target transceiver if no problem occurs during a previous data unit transmission.

23. The medium of claim 21 storing instructions that, if executed, enable the source transceiver to:
provide a non-blocking transfer of said first data unit during the data streaming session; and
monitor the non-blocking transfer to determine whether or not a data transfer operation was successful during the data streaming session.

24. The medium of claim 21 storing instructions that, if executed, enable the source transceiver to, in response to an event associated with transmission of said first data unit, send said second data unit based on the event and undertake a recovery based on said event.

25. The medium of claim 24 storing instructions that, if executed, enable the source transceiver to provide a data write in the data transfer operation.

26. The medium of claim 25 storing instructions that, if executed, enable the source transceiver to provide said data write including, placing one or more payloads of data in a buffer based on a non-blocking data transfer protocol.

27. The medium of claim 26 storing instructions that, if executed, enable the source transceiver to place said one or more payloads of data in said buffer including, posting each of said one or more payloads of data as one or more packets of data for transmission over said communication channel.

28. The medium of claim 27 storing instructions that, if executed, enable the source transceiver to:
use a local link control and adaptation protocol to keep said one or more payloads of data pending concurrently; and
use said communication link to enable a short-range radio link on a microwave carrier frequency capable of a transmission range about ten meters with a transmit power of about one miliwatt between at least one master wireless communication device to at least one slave wireless communication device.

29. The medium of claim 24 storing instructions that, if executed, enable the source transceiver to provide a data read in the data transfer operation.

* * * * *